(12) United States Patent
Shioiri et al.

(10) Patent No.: US 11,073,183 B2
(45) Date of Patent: Jul. 27, 2021

(54) SELECTABLE CLUTCH

(71) Applicant: TOYOTA JIDOSHA KABUSHIKI KAISHA, Aichi-ken (JP)

(72) Inventors: Hiroyuki Shioiri, Yokohama (JP); Taro Moteki, Ebina (JP); Yohko Yamashita, Shizuoka-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 23 days.

(21) Appl. No.: 16/504,217

(22) Filed: Jul. 5, 2019

(65) Prior Publication Data
US 2021/0003181 A1 Jan. 7, 2021

(51) Int. Cl.
*F16D 41/12* (2006.01)
*F16D 41/22* (2006.01)
*F16D 48/06* (2006.01)

(52) U.S. Cl.
CPC ........... *F16D 41/22* (2013.01); *F16D 41/125* (2013.01); *F16D 48/064* (2013.01)

(58) Field of Classification Search
CPC ......... F16D 41/12; F16D 41/125; F16D 41/14
See application file for complete search history.

(56) References Cited

U.S. PATENT DOCUMENTS

| | | | | |
|---|---|---|---|---|
| 2016/0245346 A1* | 8/2016 | Shioiri | ................. | F16D 41/125 |
| 2017/0276193 A1 | 9/2017 | Yasui et al. | | |
| 2018/0003247 A1* | 1/2018 | Samie | ................. | F16D 28/00 |
| 2019/0170198 A1* | 6/2019 | Kimes | ................. | F16D 23/02 |
| 2019/0375286 A1* | 12/2019 | Lahr | ................. | B60K 6/387 |
| 2021/0003179 A1* | 1/2021 | Shioiri | | |

FOREIGN PATENT DOCUMENTS

| | | |
|---|---|---|
| JP | H2-102964 A | 4/1990 |
| JP | 2008-248915 A | 10/2008 |
| JP | 2017-172782 A | 9/2017 |

* cited by examiner

*Primary Examiner* — David R Morris
*Assistant Examiner* — Lillian T Nguyen
(74) *Attorney, Agent, or Firm* — Hauptman Ham, LLP

(57) ABSTRACT

A selectable clutch includes: input and output members; a pocket plate connected to the output member; struts accommodated in accommodation recess portions of the pocket plate; a notch plate connected to the input member; a selector plate, disposed between the pocket plate and the notch plate; contact portions, movable in an axial direction of the rotational axis, rotating integrally with the selector plate around the rotational axis; and an actuators, fixed so as to be non-rotatable, including a plungers connected with the contact portion via bearings, cases, and coils accommodated in the cases. Further, by the coils being energized and the plungers being sucked in the axial direction, the contact portions are pushed in the axial direction, and by the contact portions being pushed to the input member, the selector plate rotates and the struts rise up.

7 Claims, 6 Drawing Sheets

SELECTABLE CLUTCH

BACKGROUND

The present disclosure relates to a selectable clutch.

Japanese Laid-open Patent Publication No. 2017-172782 discloses a selectable clutch that switches engaging and disengaging by rotating a selector plate using an actuator.

Here, as in a related-art selectable clutch disclosed in Japanese Laid-open Patent publication No. 2017-172782, in the case of rotating a selector plate in a circumferential direction, a relatively-large driving power is required, and an actuator corresponding to required driving power becomes necessary. Thus, the related-art selectable clutch has room for improvement from the standpoint of downsizing (lowering output) of the actuator.

SUMMARY

There is a need for providing a selectable clutch having a downsized actuator.

According to an embodiment, a selectable clutch includes: input and output members each rotating around a rotational axis; a pocket plate, connected to the output member, having one surface on which a plurality of accommodation recess portions is formed; a plurality of struts accommodated in the respective accommodation recess portions; a notch plate, connected to the input member, having an surface on which a plurality of engagement recess portions is formed, the surface facing the one surface of the pocket plate; a selector plate, disposed between the pocket plate and the notch plate, switching, by being rotated coaxially with the rotational axis, between a state in which the struts rise up from a pocket plate side toward a notch plate side and a state in which the struts are accommodated in the respective accommodation recess portions; a plurality of contact portions, movable in an axial direction of the rotational axis, rotating integrally with the selector plate around the rotational axis; and a plurality of actuators, fixed so as to be non-rotatable, including respective plungers connected with the contact portions via bearings, cases, and coils accommodated in the cases. Further, by the coils being energized and the plungers being sucked in the axial direction, the contact portions are pushed in the axial direction, and by the contact portions being pushed to the input member, the selector plate rotates and the struts rise up.

DETAILED DESCRIPTION

A selectable clutch according to embodiments of the present disclosure will be described with reference to the accompanied drawings. Note that the present disclosure is not limited to the embodiments described below. Further, it should be understood that the components described in the following embodiments include the components that can be easily replaced by the one skilled in the art, or components that are substantially the same thereto.

First Embodiment

Figure 1:
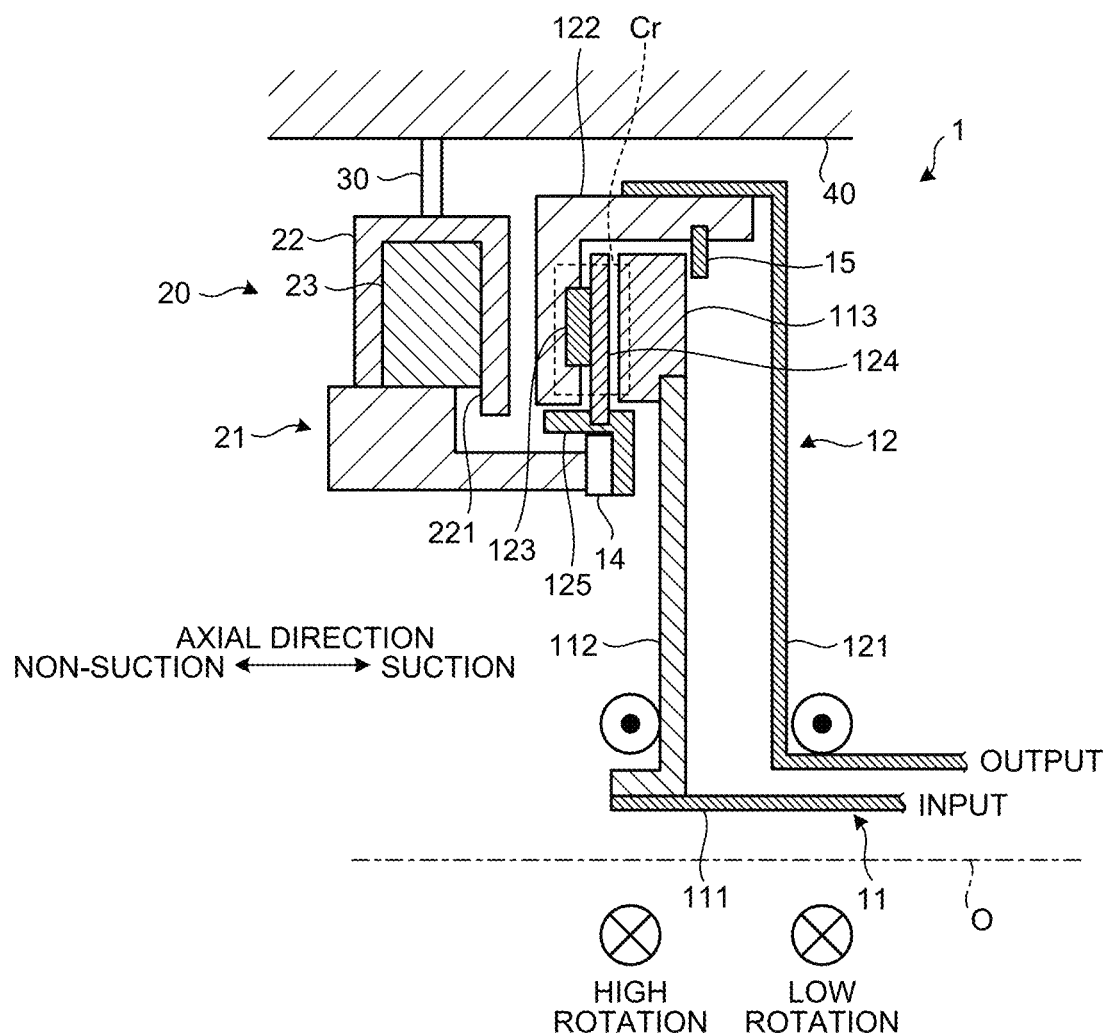
FIG. 1 is a diagram schematically illustrating an example configuration of a clutch according to a first embodiment of the present disclosure, and is a cross-sectional diagram illustrating a state before a coil is energized.
Figure 2:
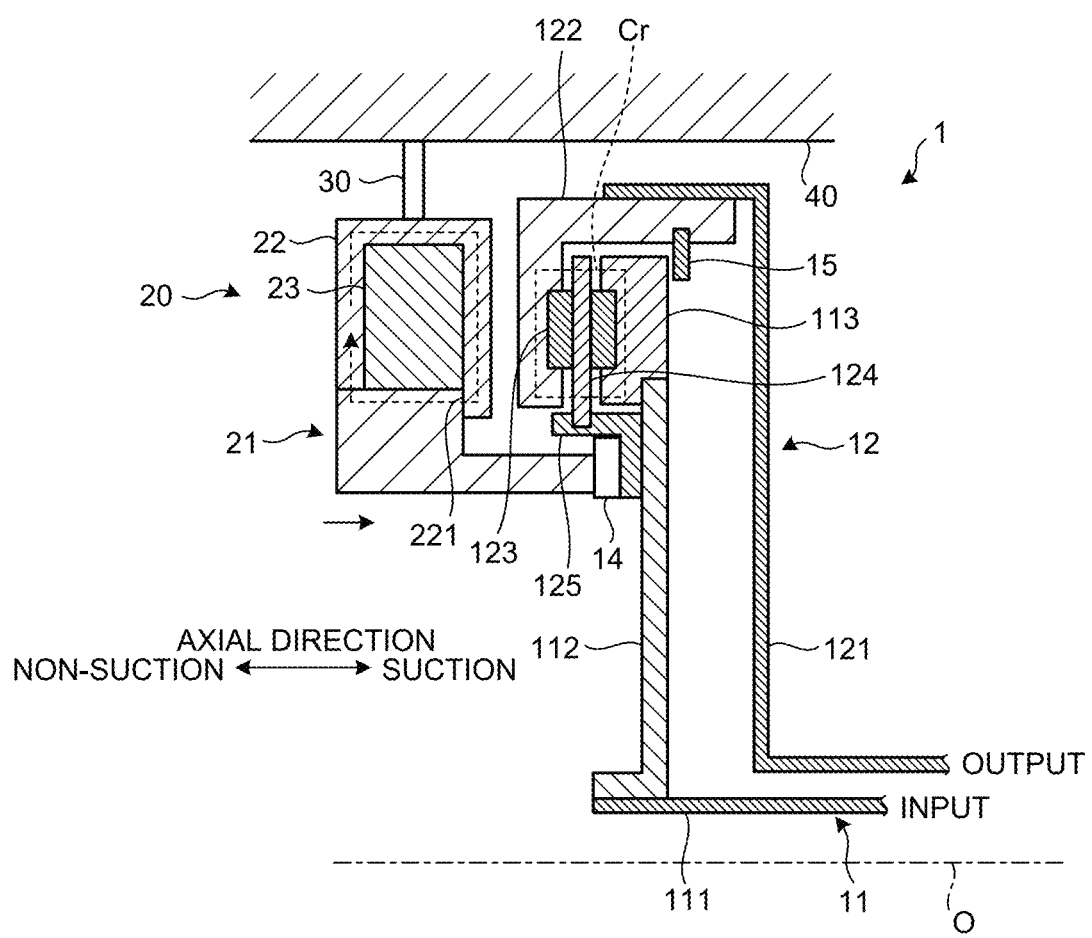
FIG. 2 is a diagram schematically illustrating an example configuration of the clutch according to the first embodiment of the present disclosure, and is a cross-sectional diagram illustrating a state after the coil is energized.

A selectable clutch 1 according to a first embodiment of the present disclosure will be described with reference to FIGS. 1 and 2. The selectable clutch 1 is mounted in a transmission for an electrically driven vehicle such as a Plug-in Hybrid Vehicle (PHV) and an Electric Vehicle (EV) as illustrated in FIG. 1. As illustrated in FIG. 1, the selectable clutch 1 includes an input member 11, an output member 12, a bearing 14, a snap ring 15, and an actuator 20. In addition, a lubricating oil for lubrication is supplied to an inside of the selectable clutch 1, especially to a portion between, for example, the input member 11 and the output member 12.

The input member 11 is connected to, for example, a rotating shaft of an engine (not illustrated) and a rotating shaft of a motor generator (not illustrated). The input member 11 includes a main body portion 111, a contact portion 112 spline-fitted to a leading end side of the main body portion 111, and a notch plate 113 fixed to the contact portion 112. The input member 11 is rotatably provided around a rotational axis O.

The notch plate 113 is formed into a ring shape, and is connected to the main body portion 111 of the input member 11. The notch plate 113 is disposed so as to face a surface on which pockets (not illustrated) of a pocket plate 122 is formed, and is relatively rotatable with respect to the pocket plate 122.

On a surface facing the pocket plate 122 of the surfaces of the notch plate 113, a plurality of notches (engagement recess portions) (not illustrated) recessed in a through-thickness direction is formed. The notches are recess portions that let one end portion of a strut 123 rising up on the notch plate 113 side to enter through a window hole (not illustrated) of a selector plate 124.

The output member 12 is connected to an output shaft (not illustrated). The output member 12 includes a main body portion 121, and the pocket plate 122 fixed to the leading end side of the main body portion 121. The output member 12 is rotatable around the rotational axis O.

The pocket plate 122 is formed in a cylindrical shape, and is connected to the main body portion 121 of the output member 12. On one surface of the pocket plate 122, that is to say, on a surface facing the notch plate 113, a plurality of pockets (accommodation recess portions) (not illustrated)

recessed in the through-thickness direction is formed. Then, a plate-like strut (engagement piece) 123 is accommodate in the pocket. In addition, the above-described "through-thickness direction" refers to a direction corresponding to the axial direction of the rotational axis O.

The strut 123 is disposed inside each pocket. Then, by the selector plate 124 rotating coaxially with the pocket plate 122, the strut 123 is switched in orientation between a state in which the strut 123 is accommodated in the pocket as illustrated in FIG. 1, and a state in which the strut 123 rises up toward the notch plate 113 side as illustrated in FIG. 2.

The selector plate 124 is disposed between the pocket plate 122 and the notch plate 113. The selector plate 124 is formed in a ring shape. In the selector plate 124, at a position facing the pocket plate 122, a window hole (not illustrated) penetrating through in the through-thickness direction is formed.

By rotating by a predetermined angle coaxially with the rotational axis O, the selector plate 124 switches between a state (engaged state) in which the strut 123 rises up toward the notch plate 113 side to be engaged with the notch, and a state (disengaged state) in which the strut 123 is accommodated in the pocket.

An elastic member (not illustrated) that regulates the rotation in the circumferential direction of the selector plate 124 is provided between the selector plate 124 and the pocket plate 122. At the engaged state of the selectable clutch 1, the selector plate 124 rotates due to a frictional force generated between a contact portion 125 and the contact portion 112 of the input member 11 overcoming a biasing force of the elastic member attached to the selector plate 124.

The contact portion 125 is attached to the inner circumferential side of the selector plate 124. The contact portion 125 is formed in a cylindrical shape. The contact portion 125 is movable (slidable) in the axial direction of the rotational axis O, and is fixed to the selector plate 124 so as to rotate integrally with the selector plate 124 around the axis of the rotational axis O.

In the selectable clutch 1, by the actuator 20 which is described below, the contact portion 125 is moved in the axial direction, and the contact portion 125 is in contact with and pressed to the contact portion 112 of the input member 11. With this configuration, by a frictional force generated between the contact portion 125 and the contact portion 112 of the input member 11, the selector plate 124 is rotated and the selectable clutch 1 is engaged. FIG. 1 illustrates the disengaged state in which engagement of the selectable clutch 1 is released, and FIG. 2 illustrates the engaged state in which the selectable clutch 1 is engaged. In the present embodiment, a region where the pocket plate 122 of the output member 12 and the notch plate 113 of the input member 11 are in contact each other at the engaged time of the selectable clutch 1 is defined as a "clutch portion Cr".

The bearing 14 is disposed between the leading end of a plunger 21 of the actuator 20 and the contact portion 125. The configuration of the bearing 14 is not specifically limited, and may be a sliding bearing such as a resin washer, or may be a rolling bearing. The snap ring 15 is formed in a ring shape, and is fitted with the inner circumferential side of the pocket plate 122. With this configuration, the snap ring 15 functions as a retainment of the pocket plate 122.

The actuator 20 switches the engaged state and the disengaged state of the selectable clutch 1. The actuator 20 is a direct operated solenoid valve, for example, and is formed in a cylindrical shape as a whole.

The actuator 20 includes the plunger 21, a case 22, and a coil 23 accommodated in the case 22. The plunger 21 is formed in a cylindrical shape having an uneven portion on an outer peripheral surface thereof, and is formed of a magnetic material. A clearance of approximately several tens of μm is formed between the plunger 21 and the coil 23.

When the coil 23 is not energized, the plunger 21 moves in the axial direction, and in a direction getting away from the contact portion 112 of the input member 11 as illustrated in FIG. 1. With this configuration, a predetermined clearance is formed between the plunger 21 and a stopper 221. On the other hand, when the coil 23 is energized, the plunger 21 moves in the axial direction, and in a direction getting close to the contact portion 112 of the input member 11 as illustrated in FIG. 2. With this configuration, the plunger 21 closely adheres to the stopper 221.

The case 22 is formed in a tubular shape, and is fixed to a fixed member 40 including a transmission case or the like via a fixing member 30. With this configuration, the actuator 20 is fixed so as to be non-rotatable around the axis of the rotational axis O. The case 22 includes the stopper 221 which is in contact with the plunger 21.

In the selectable clutch 1 having the above-described configuration, by the coil 23 being energized and the plunger 21 being sucked in the axial direction, the contact portion 125 is pushed in the axial direction and pushed to the contact portion 112 of the input member 11. Then, by the selector plate 124 rotating by a frictional force generated with the contact portion 112, the strut 123 rises up and the selectable clutch 1 engages.

In this manner, in the selectable clutch 1, because the selector plate 124 is rotated by the frictional force generated between the contact portion 125 and the contact portion 112, the actuator 20 can be downsized as compared with the case where the actuator 20 directly rotates the selector plate 124.

In other words, as compared with a related-art actuator (e.g. a motor) that directly rotates a selectable clutch, the selectable clutch 1 according to the present embodiment includes the direct operated actuator 20 that has a simpler structure and can output a greater thrust force. Thus, the actuator 20 can be downsized, a mountability can be enhanced, and the cost can be reduced.

In addition, in the selectable clutch 1, as illustrated in FIG. 1, the engagement is performed in such a manner that the number of rotations of the output member 12 side on which the number of rotations is low is made the same as that of the input member 11 side with respect to the input member 11 side on which the number of rotations is high. Then, at the time of switching from the disengaged state to the engaged state, using frictional force generated by the pressing of the actuator 20, the selector plate 124 is pulled and rotated, and the strut 123 is caused to rise up.

Thus, for example, in a state in which the magnitudes of the numbers of rotations are reversed from the normal magnitudes (that is, in a state in which the number of rotations on the output member 12 side is higher than that on the input member 11 side), even if the actuator 20 malfunctions so that a thrust force is generated, since a direction in which the selector plate 124 is pulled is opposite, the selector plate 124 does not rotate and the strut 123 does not rise up. Thus, even at the time of the malfunction of the actuator 20, the strut 123 does not collide with the notch plate 113, and the durability of the strut 123 is enhanced.

Second Embodiment

A selectable clutch 1A according to a second embodiment of the present disclosure will be described with reference to FIGS. 3 to 5. The configuration of the selectable clutch 1A is similar to that of the selectable clutch 1 except for an elastic member 13 and an actuator 20A.

The elastic member 13 transmits a thrust force of the actuator 20A (hereinafter, referred to as "actuator thrust force") to the contact portion 125. A one end portion 131 of the elastic member 13 is connected to the contact portion 125 via the bearing 14. In addition, another end portion 132 of the elastic member 13 is directly or indirectly connected to the leading end of a plunger 21A of the actuator 20A.

In addition, one end side of the elastic member 13 refers to a position on the radial direction outside of the elastic member 13, and at least refers to a portion facing and contacting the bearing 14. In addition, another end side of the elastic member 13 refers to a position on the radial direction inside of the elastic member 13, and at least refers to a portion facing and contacting the plunger 21A.

Figure 4A:
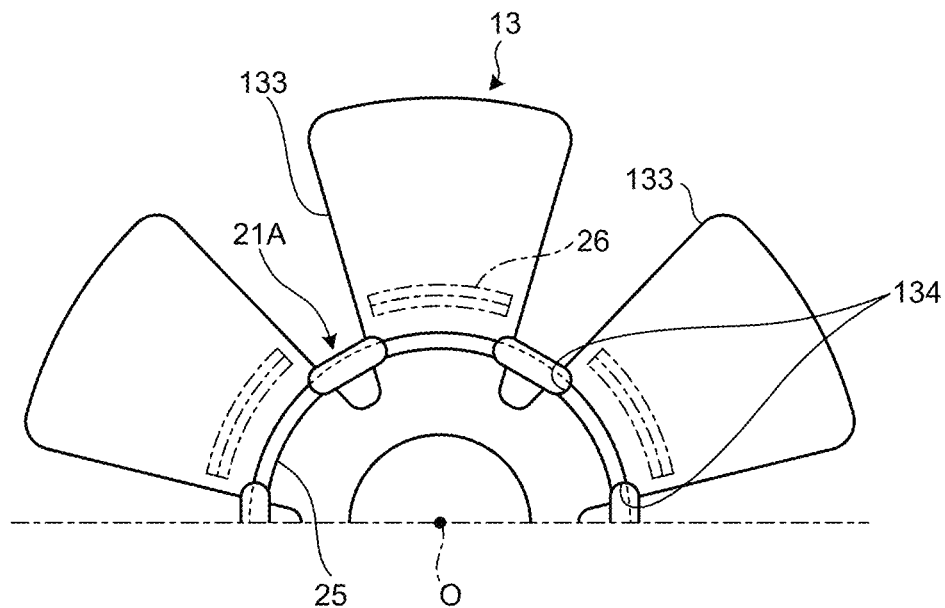
FIG. 4A is a front view schematically illustrating an example configuration of an elastic member and an protruding member of the clutch according to the second embodiment of the present disclosure.
Figure 4B:
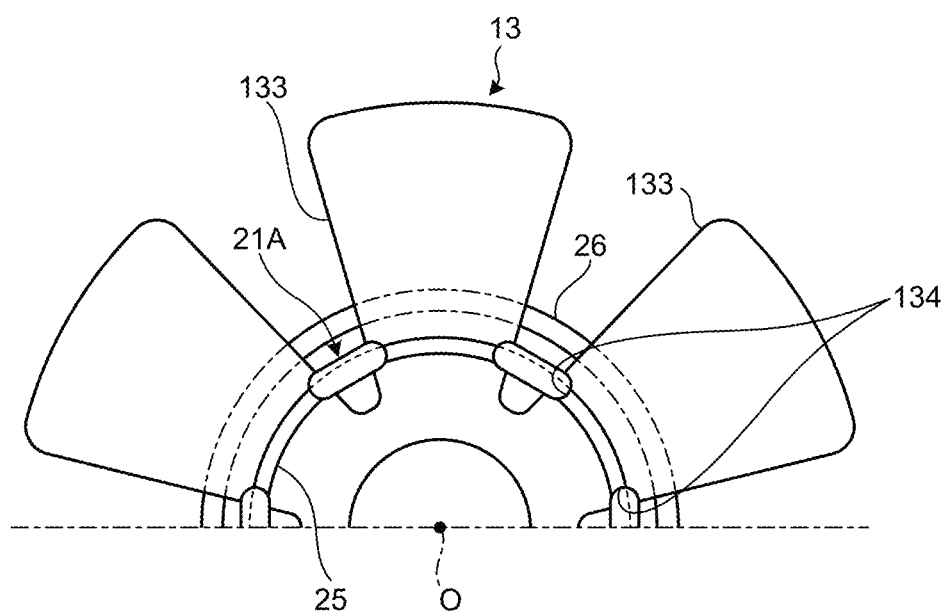
FIG. 4B is a front view schematically illustrating an example configuration of the elastic member and the protruding member of the clutch according to the second embodiment of the present disclosure.

The elastic member 13 is formed by a diaphragm spring having a thickness of approximately 0.5 mm, for example. As illustrated in FIGS. 4A and 4B, the elastic member 13 is formed in a circular disk shape in which a hole is formed at the center, and a plurality of cutout portions 133 is formed in the radial direction. In addition, the figure only illustrates an upper half of the elastic member 13.

The leading end of the plunger 21A is fitted into a groove portion 134 formed at a position on the radial direction inside of the cutout portion 133. In other words, the leading end of the plunger 21A is fitted to a root position of the cutout portion 133. In this manner, in the selectable clutch 1A, since the leading end of the plunger 21A is fitted into the cutout portion 133 of the elastic member 13, the actuator 20A and the elastic member 13 are fixed so as to be relatively-non-rotatable, and the elastic member 13 does not rotate around the rotational axis O.

Figure 5:
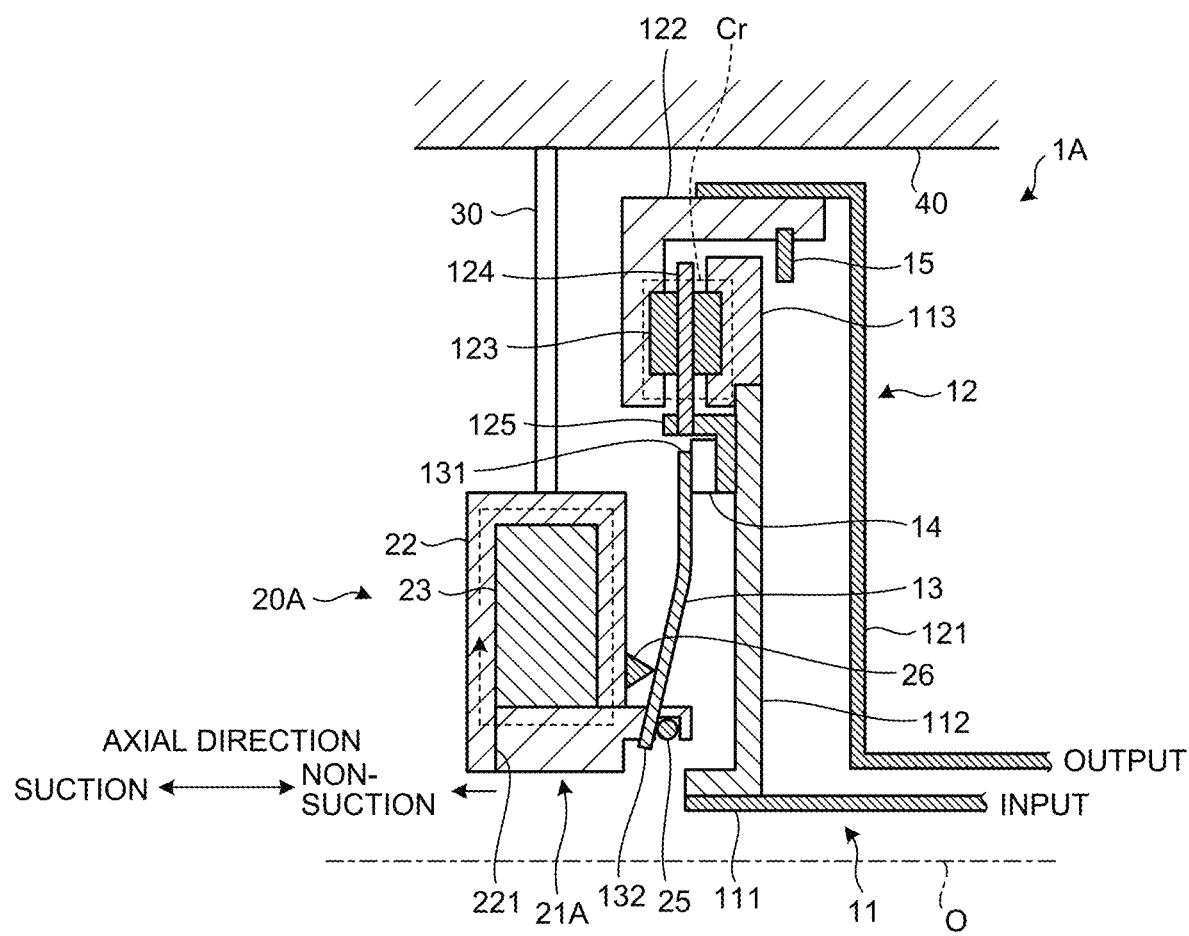
FIG. 5 is a diagram schematically illustrating an example configuration of the clutch according to the second embodiment of the present disclosure, and is a cross-sectional diagram illustrating a state after the coil is energized.

As illustrated in FIG. 5, when the coil 23 of the actuator 20A is energized and the plunger 21A is sucked in the axial direction, the another end portion 132 of the elastic member 13 moves in a suction direction, that is to say, a direction getting away from the contact portion 112 of the input member 11, and elastically deforms. Then, the one end portion 131 of the elastic member 13 pushes the contact portion 125 to the contact portion 112 of the input member 11 via the bearing 14. With this configuration, the selector plate 124 rotates and the selectable clutch 1A enters into the engaged state.

Figure 3:
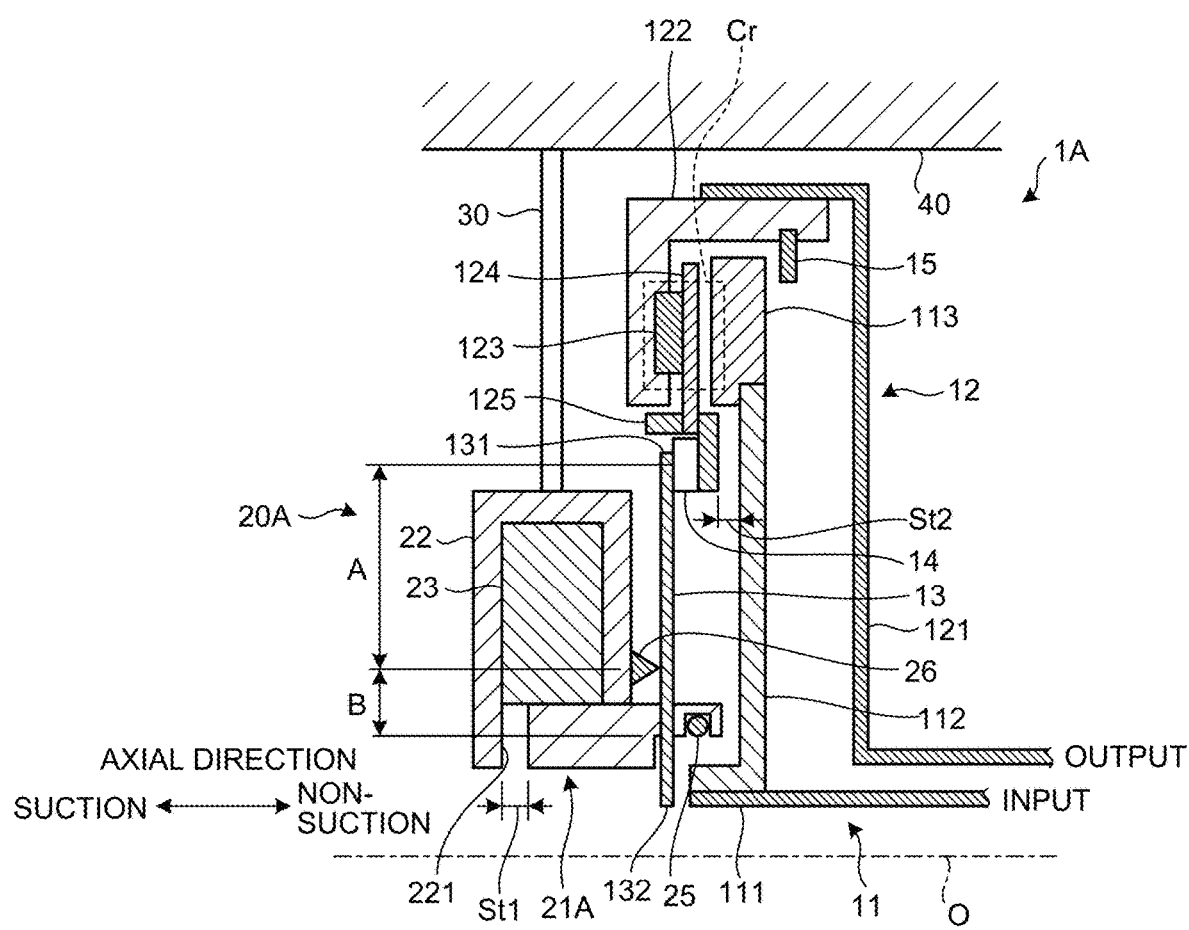
FIG. 3 is a diagram schematically illustrating an example configuration of a clutch according to a second embodiment of the present disclosure, and is a cross-sectional diagram illustrating a state before a coil is energized.

On the other hand, as illustrated in FIG. 3, when the energization of the coil 23 ends, the another end portion 132 of the elastic member 13 moves in a non-suction direction, that is to say, a direction getting close to the contact portion 112 of the input member 11, and elastic deformation is released. With this configuration, the plunger 21A moves to the initial position and the selectable clutch 1A enters into the disengaged state.

When the bias by the solenoid is released, the output shaft may be designed to be returned to its original position by, for example, a return spring (not illustrated). Alternatively, a return spring (not illustrated) may be provided between the case 22 and the plunger 21 so that, when the bias by the solenoid is released, the output shaft may be designed to be returned to its original position. In the clutch 1, when the coil 23 is not energized, a force to return the elastic member 13 to its original shape can be used. Therefore, an additional member such as the return spring is not necessary or can be downsized.

The actuator 20A includes the plunger 21A, the case 22, and the coil 23.

The plunger 21A is formed in a cylindrical shape having an uneven portion on the inner circumferential surface. When the coil 23 is not energized, the plunger 21A moves in the axial direction, and in a direction getting close to the contact portion 112 of the input member 11 as illustrated in FIG. 3. With this configuration, a predetermined clearance is formed between the plunger 21A and the stopper 221. On the other hand, when the coil 23 is energized, the plunger 21A moves in the axial direction, and in a direction getting away from the contact portion 112 of the input member 11 as illustrated in FIG. 5. With this configuration, the plunger 21A closely adheres to the stopper 221.

When the bias by the solenoid is released by the return spring (not illustrated), the output shaft may be designed to be returned to its original position and also the plunger 21A may be designed not to contact the contact portion 112 of the input member 11. Alternatively, a return spring or the like may be provided between the case 22 and the plunger 21A so that, when the bias by the solenoid is released, the output shaft is returned to its original position and also the plunger 21A is designed not to contact the contact portion 112.

The plunger 21A is formed of a magnetic material. In addition, a snap ring 25 for retaining the elastic member 13 is fitted into a groove portion formed at the leading end of the plunger 21A.

On a side surface of the case 22, a protruding member 26 contacting a portion between the one end portion 131 and the another end portion 132 of the elastic member 13 is provided. The protruding member 26 is formed to have a triangular cross section, for example, and a vertex of a triangle contacts the elastic member 13. With this configuration, when the coil 23 is energized, the elastic member 13 elastically deforms with the protruding member 26 functioning as a supporting point (refer to FIG. 5).

The protruding member 26 is disposed between a region where the contact portion 125 and the contact portion 112 contact to each other and the plunger 21A at a position closer to the plunger 21A side. In other words, a distance B between the plunger 21A and the protruding member 26 is set to be less than a distance A between the region where the contact portion 125 and the contact portion 112 contact to each other and the protruding member 26.

In addition, the actuator 20A is disposed on the inner diameter side of the region in which the contact portion 125 and the contact portion 112 of the input member 11 contact to each other. In this manner, by disposing the actuator 20A on the inner diameter side of the region where the contact portion 125 and the contact portion 112 contact to each other, a dimension in the axial direction of the selectable clutch 1A can be smaller.

In the selectable clutch 1A having the above-described configuration, when the plunger 21A is sucked by the energization of the coil 23, the elastic member 13 elastically deforms with the protruding member 26 functioning as a supporting point. With this configuration, the contact portion 125 connected to one end portion 131 of the elastic member 13 is pushed to the contact portion 112 of the input member 11, and by the selector plate 124 rotating, the strut 123 rises up and the selectable clutch 1A engages. Thus, a stroke St2 between the contact portion 125 and the contact portion 112 can be made relatively longer with respect to a stroke St1 of the plunger 21A side. The stroke St1 of the plunger 21A side is approximately 1 mm to 1.5 mm, for example, and the stroke St2 of between the contact portion 125 and the contact portion 112 is approximately 3 mm, for example. In addition, since FIG. 3 is a schematic diagram, the strokes St1 and St2 illustrated in this figure are different from the actual widths.

In addition, in the selectable clutch 1A, since a wide clearance between the contact portion 125 and the contact portion 112 can be ensured when the coil 23 is not energized, a protraction of shear resistance of lubricating oil flowing in the selectable clutch 1A or the like can be reduced. In addition, since the stroke St1 of the plunger 21A side can be made short, the actuator 20A can be downsized.

In addition, in a related-art clutch that uses an elastic member such as a diaphragm spring, since the elastic member rotates together with the clutch, the clutch thrust force or the actuator thrust force changes by an influence of the centrifugal force (the clutch thrust force is decreased by the centrifugal force exerted on the elastic member, or the required actuator thrust force increases). Thus, there has been such a problem that an engagement operation becomes unstable as compared with a case where an elastic member does not rotate, or an actuator is upsized by a design so as to overcome the centrifugal force exerted on the elastic member.

On the other hand, in the selectable clutch 1A, since the elastic member 13 is connected to the plunger 21A fixed to be non-rotatable, and is integrated therewith, the elastic member 13 does not rotate around the rotational axis O. Thus, an actuator thrust force corresponding to an actuation amount of the actuator 20A can be always generated. As a result, a clutch thrust force as designed can be generated without being influenced by the rotational speeds of the input member 11 and the output member 12. In addition, in the selectable clutch 1A, since it is possible to design without considering an influence of the centrifugal force exerted on the elastic member 13, the actuator 20A can be downsized.

In addition, in the selectable clutch 1A, by using the elastic member 13, for example, even if the stroke St2 between the contact portion 125 and the contact portion 112 varies to some extent, the variation can be absorbed by the deformation of the elastic member 13. Thus, the plunger 21A can be retained near the stopper 221 when the coil 23 is not energized, and the plunger 21A can be closely adhered to the stopper 221 when the coil 23 is energized.

In addition, the direct operated solenoid valve forming the actuator 20A has such a property that the suction power rapidly increases as getting close to a state closely-adhered to the stopper 221. Thus, in the case of the selectable clutch 1A that generates an engagement force by the plunger 21A retained near the stopper 221, the actuator 20A can be downsized, and the current for generating the engagement force can be reduced.

In addition, in the selectable clutch 1A, since the output member 12 is pushed to the input member 11 via the elastic member 13, a looseness in the axial direction in the transmission can be easily managed while ensuring required pressing force.

Third Embodiment

Figure 6:
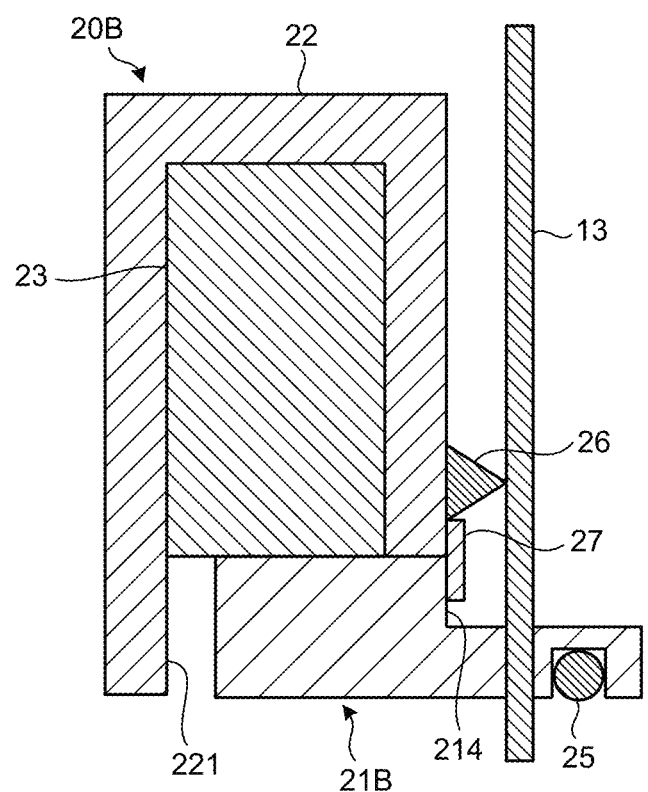
FIG. 6 is a diagram schematically illustrating an example configuration of a clutch according to a third embodiment of the present disclosure, and is a cross-sectional diagram illustrating a state before a coil is energized.

A selectable clutch according to a third embodiment of the present disclosure will be described with reference to FIG. 6. The configuration of the selectable clutch according to the present embodiment is similar to that of the selectable clutch 1 except for an actuator 20B. The actuator 20B includes a plunger 21B, the case 22, and the coil 23.

The plunger 21B is formed in a cylindrical shape having an uneven portion on the outer circumferential surface. Similarly to the above-described plunger 21A, the plunger 21B moves in a direction getting close to the contact portion 112 of the input member 11 when the coil 23 is not energized (refer to FIG. 6), and moves in a direction getting away from the contact portion 112 of the input member 11 when the coil 23 is energized. In addition, similarly to the above-described plunger 21A, the plunger 21B is formed of a magnetic material. In addition, the plunger 21B has a contact surface 214 extending along the radial direction of the selectable clutch that is orthogonal to the axial direction.

On a side surface of the case 22, a regulation member 27 is provided, that regulates a movement in the axial direction of the plunger 21B by contacting the above-described contact surface 214 when suction of the plunger 21B is released (at the non-suction time). The regulation member 27 is formed of a plate-like member, and is disposed at a position that is provided on the radial direction inside of the protruding member 26, and is a boundary position of the case 22 and the plunger 21B.

According to the selectable clutch having the above-described configuration, by including the regulation member 27 that regulates the movement in the axial direction of the plunger 21B, a detachment of the plunger 21B after assembly can be suppressed. With this configuration, since a clearance of the plunger 21B side and a clearance between the contact portion 125 and the contact portion 112 can be set to preset values when the coil 23 is not energized, the stability of an operation of the actuator 20B can be enhanced. In addition, since a wide clearance between the contact portion 125 and the contact portion 112 can be ensured when the coil 23 is not energized as designed, a protraction of shear resistance of lubricating oil or the like can be reduced.

Hereinbefore, the selectable clutch according to the present disclosure has been specifically described using embodiments for carrying out the present disclosure, but the scope of the present disclosure is not limited to these descriptions, and is to be broadly interpreted based on the description set forth in the appended claims. In addition, it should be appreciated that various modifications, changes and the like that are made based on these descriptions are also included in the scope of the present disclosure.

For example, in the selectable clutches according to the first to third embodiments, recesses and projections may be formed on a contact surface of the contact portions 112 and 125. By forming recesses and projections on the contact surface of the contact portions 112 and 125, when the contact portion 125 is pushed to the contact portion 112 when the coil 23 is energized, the recesses and projections on the contact surface engage with each other. Thus, the frictional force increases, and the selector plate 124 can be rotated more reliably.

For example, the number of the actuators of the selectable clutch of the present disclosure is not limited to one. That is, the selectable clutch of the present disclosure may include a plurality of actuators. In this case, for example, the actuators may be circularly distributed around the rotational axis O, or may be integrated into one case.

For example, the protruding members may be circularly distributed around the rotational axis O as illustrated in FIG. 4A, or may be integrated as illustrated in FIG. 4B.

According to the selectable clutch according to the present disclosure, since the selector plate is rotated by the frictional force generated between the contact portion and the input member, the actuator can be downsized as compared with the case of directly rotating the selector plate using the actuator.

According to an embodiment, in the selectable clutch according to the present disclosure, by the coil being energized and the plunger being sucked in the axial direction, the contact portion is pushed in the axial direction and pushed to the input member. Then, by the selector plate rotating by the frictional force generated between the input member and the contact portion, the struts rise up and the selectable clutch engages.

According to an embodiment, in the selectable clutch according to the present disclosure, when the plunger is sucked by the energization of the coil, the elastic member elastically deforms with the protruding member functioning as a supporting point. With this configuration, the contact portion connected to one end side of the elastic member is pushed to the input member, and by the selector plate rotating, the struts rise up and the selectable clutch engages. Thus, a stroke of the clutch portion side can be made relatively longer with respect to a stroke of the plunger side. In addition, since a wide clearance of the clutch portion can be ensured at the non-energized time of the coil, a protraction of shear resistance of lubricating oil or the like can be reduced. In addition, since the stroke of the plunger side can be made short, the actuator can be downsized.

According to an embodiment, in the selectable clutch according to the present disclosure, since the leading end of the plunger is fitted into the cutout portion of the elastic member, the actuator and the elastic member are fixed so as to be relatively-non-rotatable, and the elastic member does not rotate around an axis.

According to an embodiment, in the selectable clutch according to the present disclosure, by including the regulation member that regulates a movement in the axial direction of the plunger, a clearance of the plunger side and a clearance of the clutch portion can be set to preset values at the non-energized time of the coil. Thus, the stability of an operation of the actuator can be enhanced. In addition, because a wide clearance of the clutch portion can be ensured at the non-energized time of the coil as designed, the protraction of shear resistance of lubricating oil or the like can be reduced.

According to an embodiment, since the selectable clutch according to the present disclosure returns the plunger to the initial position using the force of the elastic member returning to the original shape at the non-energized time of the coil, an additional member such as a return spring becomes unnecessary, and the number of components and cost can be reduced.

According to an embodiment, in the selectable clutch according to the present disclosure, since the actuator is disposed on the inner diameter side of the clutch, the dimension in the radial direction of the clutch can be downsized.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A selectable clutch comprising:
   input and output members each configured to rotate around a rotational axis;
   a pocket plate, connected to the output member, having one surface on which a plurality of accommodation recess portions is formed;
   a plurality of struts accommodated in the respective accommodation recess portions;
   a notch plate, connected to the input member, having an surface on which a plurality of engagement recess portions is formed, the surface facing the one surface of the pocket plate;
   a selector plate, disposed between the pocket plate and the notch plate, configured to switch, by being rotated coaxially with the rotational axis, between a state in which the struts rise up from a pocket plate side toward a notch plate side and a state in which the struts are accommodated in the respective accommodation recess portions;
   a plurality of contact portions, movable in an axial direction of the rotational axis, configured to rotate integrally with the selector plate around the rotational axis; and
   one or more actuators, fixed so as to be non-rotatable, including respective plungers connected with the contact portions via bearings, cases, and coils accommodated in the cases,
   wherein, by the coils being energized and the plungers being sucked in the axial direction, the contact portions are pushed in the axial direction, and by the contact portions being pushed to the input member, the selector plate rotates and the struts rise up.

2. The selectable clutch according to claim 1, further comprising:
   an elastic member having one end portion connected to the contact portions via the bearings and another end portion directly or indirectly connected to the plungers; and
   a plurality of protruding members, provided on a side surface of the cases, configured to contact respective portions between the one end portions and the another end portions of the elastic member,
   wherein, by the another end portions of the elastic member being pushed in a direction of the suction when the coils are energized, and the elastic member elastically deforming with the protruding members functioning as supporting points, the contact portions are pushed in the axial direction, and by the contact portions being pushed to the input member, the selector plate rotates and the struts rise up.

3. The selectable clutch according to claim 2,
   wherein the elastic member is formed in a circular disk shape and includes a plurality of cutout portions formed in a radial direction, and
   wherein leading ends of the plungers are fitted into the respective cutout portions.

4. The selectable clutch according to claim 3,
   wherein the plungers include respective contact surfaces extending along a direction orthogonal to the axial direction, and
   wherein, on side surfaces of the cases, respective regulation members are provided, the regulation members regulating a movement in the axial direction of the plungers by contacting the contact surfaces when suction of the plunger is released.

5. The selectable clutch according to claim 2,
   wherein the one or more actuators are disposed on an inner diameter side of regions where the output member and the input member contact to each other.

6. The selectable clutch according to claim 2,
   wherein the protruding members are integrated.

7. The selectable clutch according to claim 1, wherein the one or more actuators are integrated in one case.

* * * * *